July 7, 1959

S. J. GARTNER 2,894,202

TUBE KNOCKER

Filed Sept. 28, 1955

INVENTOR
STANLEY J. GARTNER

BY *Michael Hertz,*

ATTORNEY

July 7, 1959    S. J. GARTNER    2,894,202
TUBE KNOCKER

Filed Sept. 28, 1955    3 Sheets-Sheet 2

INVENTOR
STANLEY J. GARTNER

BY *Michael Hertz*
ATTORNEY

July 7, 1959 S. J. GARTNER 2,894,202
TUBE KNOCKER

Filed Sept. 28, 1955 3 Sheets—Sheet 3

INVENTOR
STANLEY J. GARTNER

BY Michael Hertz
ATTORNEY

United States Patent Office

2,894,202
Patented July 7, 1959

2,894,202

TUBE KNOCKER

Stanley J. Gartner, Emporium, Pa., assignor, by mesne assignments, to Sylvania Electric Products Inc., Wilmington, Del., a corporation of Delaware Application September 28, 1955, Serial No. 537,083

6 Claims. (Cl. 324—20)

The present invention relates to impact-testing apparatus, and in particular to a mechanical actuated impacting device utilized for uniformly impact-testing electron tubes or other articles.

In the ensuing description, impact-testing of an electron tube is described for illustrative purposes only, for it will be obvious that the impacting device can be utilized in connection with any article desirably tested for appropriate characteristics by means of shock energy excitation.

In testing electron tubes for noise, microphonics, resonance, poor or faulty connections, internal short circuits, and certain forms of vibrations, it is customary to connect the tube undergoing test to an external indicating unit. The indicating unit is arranged to supply operational potentials to the tube components being tested and to provide visual, audible, or both indications of defects. When thus connected, the electron tube is usually subjected to a series of mechanical impacting cycles to place the internal components of the electron tube in relative motion, thereby causing any defects therein, such as poor welds, microphonics, intermittent short circuits, and the like to manifest themselves as visual or audible indicia in the related indicating unit.

For purposes of ascertaining the conformity of the electron tubes to electrical and mechanical specifications, it is imperative that each tube of a given type and application thereof be impact-tested under identical conditions. Accordingly, the series of mechanical shocks or impacts imparted to each tube being tested must be uniform in force, in spacing between adjacent impacts, in duration of individual impacts, in number and in direction. In the case of tubes utilized at high frequencies and in other applications adversely sensitive to microphonics and other internal vibratory effects, it is desirable for purposes of indicating unwanted vibratory motions in internal components of such tubes, to subject them to one or more impacting cycles comprising a predetermined number of very rapid, uniform blows. Further, in order that the testing apparatus be adaptable for testing a variety of types and sizes of tubes and in order that for a given tube type the effects of constructional variation and the operational errors involved in holding the tube in the testing socket be minimized, it is essential that the number of blows imparted to the tube during each impacting cycle be readily adjustable and that the momentum of the impacting member be constant through its traverse or path of impacting movement. Thus, both in the same and in succeeding impacting cycles, the blows imparted to the wall or envelope of the tube must be substantially constant in force, within constructional limits of the impacting device, regardless of the diameter and position of the tube being tested. Furthermore, in order to permit facile adaptation in testing procedures required for the differing types of electronic tubes or for differing applications of a single tube type, it is necessary that the impacting device admit of ready adjustability in the number and rapidity of impacts in the impacting cycle thereof.

In the known manually, electrically, and mechanically actuated impacting devices utilized heretofore for shock-testing electron tubes and other articles, the foregoing essential characteristics of the impacts delivered, which are essential to accurate testing, were not adequately provided. Thus in the case of tubes, unreliable test data, improperly rejected tubes, and improperly passed tubes frequently occurred as a result of uncontrolled variations in the impacts delivered by the known impacting devices. Moreover, due to the difficulty in judging the striking force of manual devices or in adjusting the impacting means of prior electrical or mechanical devices, tubes employing fragile envelopes or delicate internal structures were frequently destroyed.

Briefly, impact-testing devices embodying and demonstrating features of the present invention are of the mechanically controlled and regulated type and are of the same general class as that disclosed in the patent to Roy Arthur McNaughton, Patent 2,738,459, patented March 13, 1956, and assigned to the assignee of the present invention. As pointed out therein, mechanically controlled operation of the impacting device eliminates many of the difficulties encountered when using electrically actuated impacters, for examples, variations in impacting force with changes in energizing potentials and spurious noise in the electrical testing apparatus.

Accordingly, it is an object of the present invention to provide a mechanically actuated impacting device. Another object is the provision of an impacting device capable of uniformly imparting a series of rapid blows or impacts to the article being tested. A further object is the provision of means in an impacting device whereby the force imparted by an impacting member of said device is relatively constant throughout the path of impacting movement of the member. Still another object, is the provision of an impacting device capable of uniformly imparting a predetermined number of impacts to an article being tested at a predeterminable rate of repetition. Another object is the provision of means in an impacting device for readily adjusting the rate of repetition of impacts delivered by the device. Still another object is to provide mechanically operated and controlled testing apparatus for uniformly testing electronic tubes in a manner virtually precluding the generation of spurious interference and noise.

The foregoing and additional objects and advantages of the invention will become apparent from the following detailed description of one illustrative embodiment thereof adapted for use in testing electronic tubes, but equally adaptable in connection with other articles, said description to be taken in connection with the accompanying drawings in which.

In accordance with the principles of this invention an impacting member is mounted to deliver uniform blows or impacts, the rapidity or rate of which is readily adjustable as hereinafter more fully described, to an electronic tube or other article undergoing testing. The desired uniformity is attained by imparting a relatively constant momentum to the impacting member, as by cancelling the effect of the mechanical driving means therefor, immediately after the member has been set in motion. The impacting member, then, is left free to travel solely by the inertia thereof throughout substantially the entire path of impacting movement. Therefore, operational errors in holding or adjusting the position of the tube or other article will not effect the uniformity of the impacts delivered thereto. This fact becomes increasingly important where a number of such impacting members are mounted for delivering uniform impacts at a plurality of points on the surface of the electronic tube or other article being tested.

Figure 1:
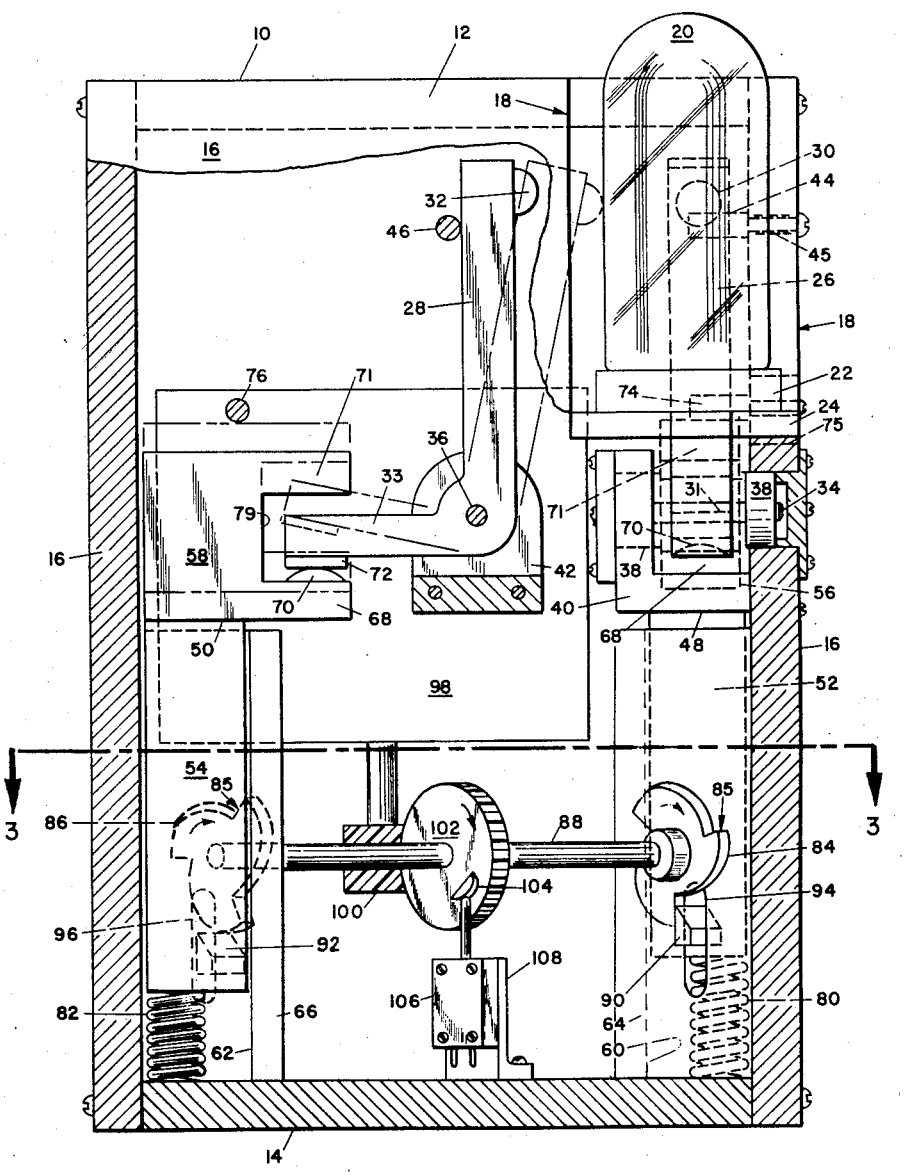
Fig. 1 is a side elevational view of one exemplary application of the invention said view having parts removed and other parts broken away for clearness.
Figure 2:
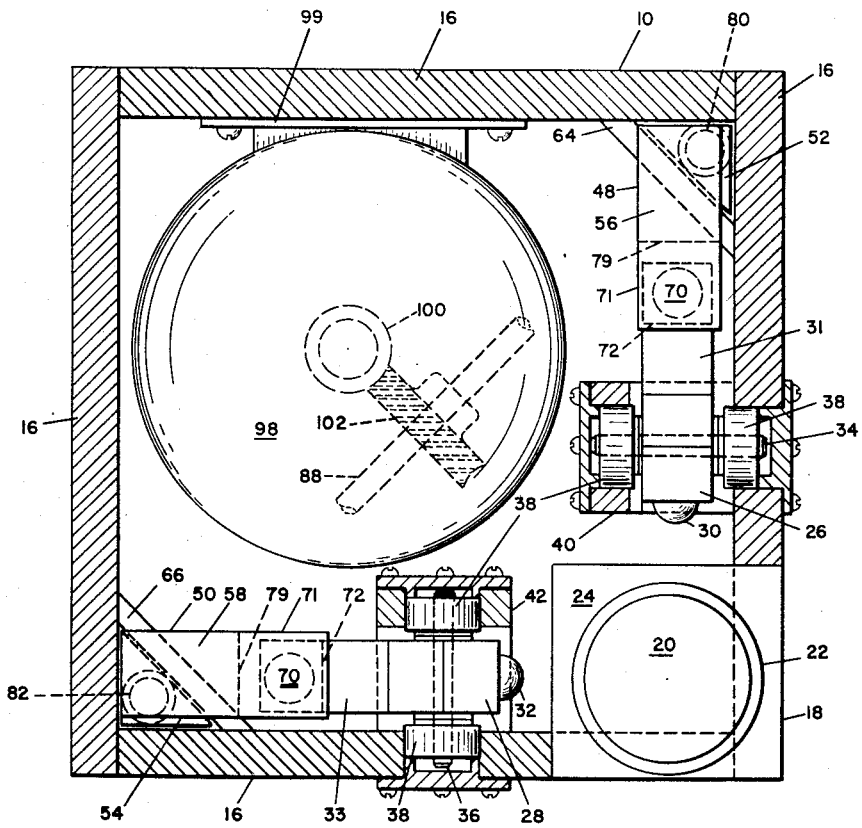
Fig. 2 is a top plan view of Fig. 1 with various parts broken away, sectioned, or removed for clearness.

Referring now to Figs. 1 and 2, there is shown, as one illustrative form of the invention, a mechanical impacting device adapted particularly for use in impact-testing an electronic tube. The device includes a housing 10 having a top wall 12, a base or bottom wall 14, and sides 16, two contiguous sides having notchers 18 to permit access to the electronic tube 20 being tested and the socket 22 therefor, mounted on the mounting plate 24.

Mounted within the housing 10 adjacent the socket 22 are a pair of impacting members or tappers in the form of bellcrank levers 26 and 28, having individual heads 30 and 32 and operating extensions 31 and 33. The members 26 and 28 are arranged to deliver uniform blows at points on the tube 20 more or less at right angles to one another; however, suitable changes may be made in the mountings for said members to deliver blows at different angles. For uniformity of impacts delivered the impacting members 26 and 28 together with their associated driving mechanisms are made identical and are individually mounted on the pivot shafts 34 and 36 supported by antifrictional means, such as the bearings indicated generally at 38, in turn mounted in the walls 16 and the brackets 40 and 42, respectively. By utilizing identical impacting members 26 and 28 and through the use of anti-frictional mountings therefor, rapidity of impacts and uniformity from blow to blow are obtained, and the members therefore will travel with substantially constant velocity, after an initial impetus or motion has been supplied thereto, along their respective paths of action. It will be appreciated that, with minor changes in the herein described structure, the impacting members may be mounted for movement through horizontal paths, as by mounting on the same or different vertical shafts, or that a greater or less number of impacting members may be utilized.

Mechanical motion-imparting means are arranged in operative relationship with the impacting members 26 and 28 for periodically setting the latter in motion for impacting movement along their respective predetermined paths. When placed in motion from the initial or rest position in said paths, as illustrated by the position of impacting member 28 (Fig. 1) and as determined by the respectively adjustable stops 44 and 46 associated with slots 45, the impacting members move with constant momenta until the tube 20 is struck. To this end the influence of the motion-imparting mechanism upon the impacting member can be terminated immediately after the members have been set in motion along their respective paths. With this arrangement, the blows delivered to tube 20 will be substantially constant despite variations in the size or position of the tube tested, within the constructional limitations of the device.

One form of motion-imparting mechanism includes the driving arms 48 and 50 comprising the triangular posts 52 and 54 and the brackets 56 and 58. The posts are arranged to reciprocate within parallelly disposed sheaths 60 and 62 formed by diametric corners of the housing 10 and the individual sheath-plates 64 and 66. Each of the brackets 56 and 58 is formed with projections 68 and 71, projections 68 being provided with shot-pins 70. Each shot-pin 70 is fabricated from appropriately hard material and is adapted to impart a blow, upon the thrust of the upwardly biased driving arm 48 or 50, to the respective shot-plate 72 attached to the operating extension 31 or 33 of the impacting member 26 or 28, thereby setting the associated impacting member in motion toward a position of impact-delivering relationship with the tube 20. Where only one impacting movement of each of the members 26 and 28 is desired for each respective thrust of the driving arm 48 and 50, immediately after the operating extension 31 or 33 is struck by the individual driving arm 48 or 50, further contact with the impacting members 26 and 28 is interrupted by the respective adjustable stops 74 and 76 associated with slots 75. Thereafter, through substantially all of their respective paths of impacting movement the members 26 and 28 travel with substantially constant momenta until the traverse is completed upon striking the tube 20 being tested.

For testing procedures requiring a greater rapidity or number of impacts per testing cycle, the adjustable stops 74 and 76 can be altered to permit further upward travel of the driving arms 48 and 50, respectively, to a distance which at most is slightly less than the drop 85 of the cams 84 and 86, to be described hereinafter. The impacting members 26 and 28 then are permitted upon bouncing back toward their individual, adjustable stops 44 and 46 to be struck and set in motion a multiple number of times for each release or thrust of the driving arms 48 and 50 until the latter reach their associated stops 74 and 76. Thus the rapidity and number of blows in the impacting cycle may be readily controlled by adjusting the stops 74 and 76, and 44 and 46. To increase the multiplicity of blows and to protect fragile tubes from shocks having a steep wave front resilient material such as rubber is desirably utilized for the heads 30 and 32. By proper selection of the driving springs 80 and 82 and of the displacements 85 of the cams 84 and 86, and proper construction of the impacting members 26 and 28, even in the case where multiple action of said members is desired, the resulting impacts imparted to tube 20 can be made uniform from blow to blow throughout the impacting cycle. Accordingly, as soon as the extensions 31 and 33 of the impacters 26 and 28 are struck individually by the driving arms 48 and 50, the driving contact thereof with said impacters is interrupted by such striking and impacting members 26 and 28 then travel by their own momenta until the tube 20 is impacted. Subsequently the members 26 and 28 bounce back to be again struck by the associated driving arms 48 and 50, if the stops 74 and 76 are so adjusted, or are returned to their rest positions as defined by the adjustable stops 44 and 46 prepartory to the subsequent release or thrust of the driving arms 48 and 50, respectively, as described below more fully.

When the driving arms 48 and 50 are respectively displaced downwardly against the driving means therefor, the impacting members 26 and 28 respectively are returned to their initial positions as defined by the stops 44 and 46, by means of the individual projections 71 provided for that purpose on each of the brackets 56 and 58. After impacting movement of the members 26 or 28 the withdrawal of the associated driving arm 48 or 50 causes the projection 71 thereof to contact the operating extension 31 or 33, thus returning the impacting member 26 or 28 to its initial position. The projections 68 and 71 define indents or notches 79 in each of the brackets 56 and 58 in which the operating extensions 31 and 33, respectively, are free to move throughout the path of impacting movement of the members 26 and 28, until the driving arms are displaced downwardly to their release positions, as illustrated by the full line position of driving arm 50, Fig. 1.

The driving arms 48 and 50 may be biased toward contact with the associated operating extensions 31 and 33 of the tappers 26 and 28 by a variety of propelling means, as the driving springs 80 and 82 disposed within the sheaths 60 and 62, respectively, and bearing against the posts 52 and 54. Other propelling means including hydraulic or pneumatic cylinders, or continuously acting electrical solenoids may be utilized. The driving arms 48 and 50, are alternately, as illustrated in Fig. 1, or in some other timed relationship, displaced downwardly against the action of the driving springs 80 and 82, by appropriate displacing mechanism to points whereat the respective driving arms are abruptly released by the mechanism for impingement against the individual operating extensions 31 and 33 of the impacting members 26 and 28, as described heretofore.

Figure 3:
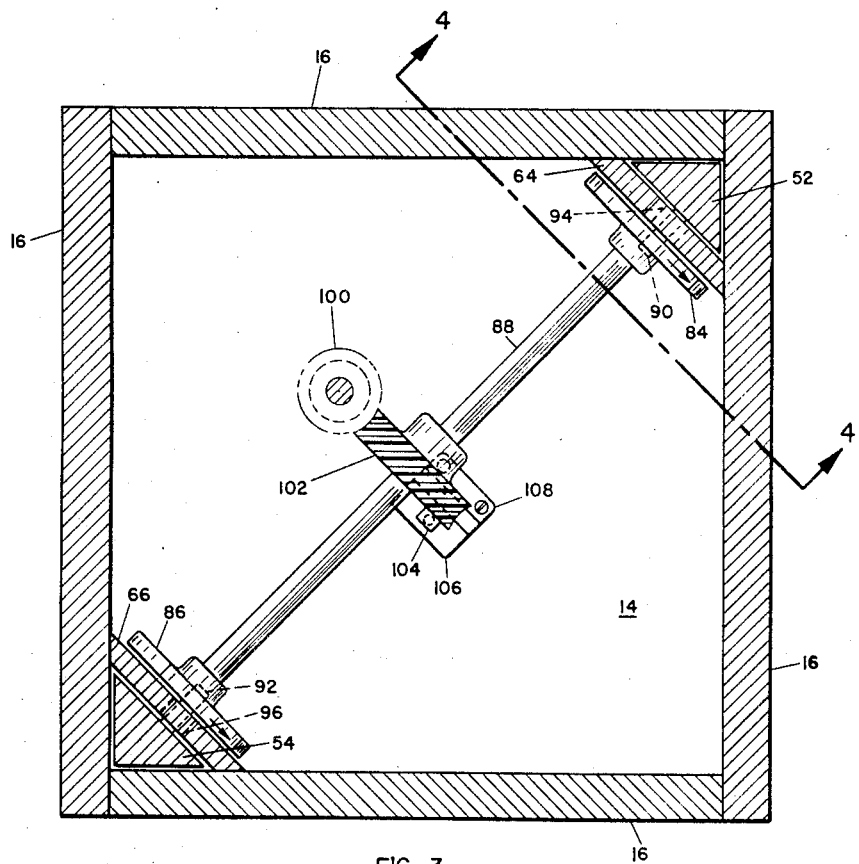
Fig. 3 is a view from line 3—3 of Fig. 1.
Figure 4:
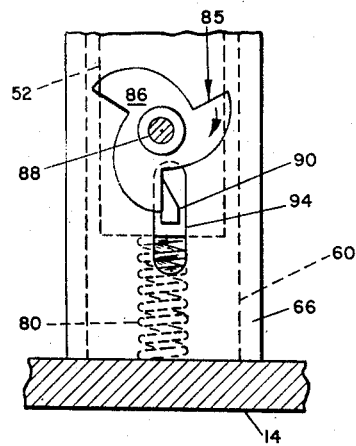
Fig. 4 is a view taken along line 4—4 of Fig. 3.

Referring more particularly to Figs. 1, 3, and 4, an exemplary form of displacing mechanism, shown therein, includes a pair of displacing cams 84 and 86 having appropriate rise and dwell portions adapted to alternately displace and abruptly release the driving arms 48 and 50. The cams 84 and 86 are mounted on the drive-shaft 88 which may be supported by the sheath-plates 64 and 66 or by suitable brackets (not shown) mounted on the base 14 of the housing 10. The displacements of the driving arms 48 and 50 are effected by means of the cam follower projections 90 and 92 individually affixed to the posts 52 and 54 of the driving arms 48 and 50 and engaging the cam developments. The sheath-plates 64 and 66 are provided with the slots 94 and 96 through which the projections 90 and 92 extend and reciprocate, as best shown in Fig. 4.

The displacing projections 90 and 92 are actuated through use of appropriate driving mechanism, as the motor 98 mounted within the housing 10 (Figs. 1 and 2) by means of the cradle 99 and operably connected to the shaft 88 through suitable gearing, including the worm gear 100 and the driving gear 102 mounted on the drive shaft 88. By appropriate selection of the cam development, tube 20 may be impacted in alternation at equally spaced intervals and for a given number of times through a tapping cycle, which corresponds arbitrarily to one complete revolution of the driving gear 102. Such cycle, in one embodiment of the invention may be defined or terminated by the cam-tripping mechanism 104 and the associated closed biased switch 106 (Figs. 1 and 3) mounted in the housing 10 by means of the bracket 108, so that at the end of one complete revolution of the driving gear 102 the power to the motor 98, through well-known circuitry, may be cut off. To initiate a subsequent cycle a by-passing switch (not shown) may be provided to momentarily by-pass switch 106, in a well-known manner, until the latter switch is again permitted to close by rotation of the driving gear 102.

In operation, power is supplied to the drive-shaft 88 by activation of the motor 98, whereupon, the displacing cams 84 and 86 having their respective developments opposite and in respective contact with the followers 90 and 92, the driving arm 48 is released (Figs. 1 and 2) by the cam 84 to impinge, under impetus of the driving spring 80, against the operating extension 31 of the impacting member 26 thereby causing said member to travel toward tube 20 and away from the stop 44. At the same time, the driving arm 50 is being displaced downwardly by the cam 86 thereby returning the impacting member 28 to its initial or rest position against the stop 46 and also further compressing the driving spring 82, as shown in Fig. 1. Immediately after the driving arm 48 strikes the operating extension 31 of the member 26, upward motion of the driving arm 48 is terminated in one form of the invention by the adjustable stop 74, in order to interrupt contact between the extension 31 and the shot-pin 70. Alternatively, the stop 74 may be adjusted to lengthen the thrusting movement of arm 48 thereby permitting the member 26 to be set in motion more than once for each displacement of the driving arm 48. After the impacting member 26 is struck it is then left substantially free of any external influence to travel under its own constant momentum until the tube 20 is struck. Similarly member 28 is impelled during the impacting cycle by further rotation of the cam 86 and release of the driving arm 50 which travels to the position shown in broken lines of Fig. 1. Uniformity of impacts is thereby obtained, which will be relatively unaffected by variations in size or position of the tube 20. A number of tube types may therefore be tested without adjustment of the herein described impacting device, save for replacement of socket 22.

Rapidity of impacts is readily adjustable without changing the cam developments, and the driving arms 48 and 50 are adapted both for setting the impacting members 26 and 28 in motion and for returning the members to their initial positions upon completion of the impacting movements. Although the displacing cams 84 and 86 are positioned so that the impacting members 26 and 28 are impelled in alternation at equally spaced intervals toward the tube 20, it will be appreciated that any other timing sequence may be selected by appropriate revision of the illustrated cam developments.

From the foregoing it will be apparent that novel and efficient apparatus is provided for uniformly and rapidly impact-testing an article, which in the case of electronic tubes is not critically dependent upon the size or location of the tube. The impacting device has the advantage of simplicity and compactness in design with few moving parts thereby minimizing the problems of wear and maintenance, and permitting easy increases in the repetitive speed of the impacting members 26 and 28. The aforementioned advantages are obtained by a mechanical arrangement to insure reproducibility in operation and to prevent spurious electrical interference or noise in testing electronic tubes or similar devices.

Numerous modifications will occur to those skilled in the art, without departing from the spirit and scope of the present invention, and accordingly the appended claims should be given a latitude of interpretation consistent with the foregoing disclosure. Moreover it will be appreciated that certain features of the invention may be utilized without a corresponding use of other features.

Therefore, what is claimed as new is:

1. In an impacting device for use in impact-testing an article, an impacting member, means for mounting said member for travel along a path of impacting movement, a driving arm having a projection operable to strike said member at least once during an advance movement of the driving arm, a second projection forming a part of said driving arm for returning said impacting member to its initial position in said path upon a retracting movement of the driving arm, the impacting member being unrestrainedly loosely positioned between said projections and free to move therebetween to enable the impacting member to strike the article several times during the advance movement of the impacting member.

2. In an impacting device for use in impact-testing an article, an impacting member, means for mounting said member for travel along a path of impacting movement, a driving arm having a projection operable to strike said member at least once during an advance movement of the driving arm, a second projection forming a part of said driving arm for returning said impacting member to its initial position in said path upon a a retracting movement of the driving arm, the impacting member being unrestrainedly loosely positioned between said projections and free to move therebetween to enable the impacting member to strike the article several times during the advance movement of the impacting member, and variably positioned means to limit the advance movement of the driving arm to thereby vary the number of times the impacting member will strike the article.

3. In an impacting device for use in impact-testing an article, an impacting member, means for mounting said member for travel along a path of impacting movement, a driving arm having a projection operable to strike said member at least once during an advance movement of the driving arm, a second projection forming a part of said driving arm for returning said impacting member to its initial position in said path upon a retracting movement of the driving arm, the impacting member being unrestrainedly loosely positioned between said projections and free to move therebetween to enable the impacting member to strike the article several times during the advance movement of the impacting member, and variably positioned means to limit the movement of the impact movement of the impact member away from the article to vary the force of impact of the arm against the article.

4. An impacting device for impact testing an article comprising a pivoted bell crank lever having at one end of the cell crank an article striking head, a rectilinearly reciprocatable driving member having a post and a pair of parallel projections extending at right angles to the post, said projections straddling the opposite end of said bell crank lever with freedom of motion of said end of the lever between the projections to allow vibration of said lever end in the space between the projections, means for imparting sudden forward movement to the post to repeatedly bring the striking head against the article, and means to retract the post.

5. An impacting device for use in impact testing an article comprising a bell crank lever having a vertical arm provided with an article striking head and a horizontal operating arm, a vertical post rectilinearly movable along its axis having a pair of projections straddling the horizontal operating arm, a spring biasing the post upwardly, a projection extending laterally from the post, and motor driven cam means with a precipitous vertical drop operative on the third projection to withdraw the post against the force of the spring and to suddenly release the post to the action of the spring to thereby cause one of the projections of the pair to strike the impacting member and the impacting member to strike the article.

6. An impacting device for use in impact testing an article comprising a bell crank lever having a vertical arm provided with an article striking head and a horizontal operating arm, a vertical post rectilinearly movable along its axis having a pair of projections loosely straddling the horizontal operating arm, a spring biasing the post upwardly, a projection extending laterally from the post and motor driven cam means with a precipitous vertical drop operative on the third projection to withdraw the post against the force of the spring and to suddenly release the post to the action of the spring to thereby cause one of the projections of the pair to strike the impacting member and the impacting member to strike the article repeatedly.

References Cited in the file of this patent

UNITED STATES PATENTS

| 835,183 | Eden | Nov. 6, 1906 |
| 845,720 | Simpkins | Feb. 26, 1907 |
| 995,439 | Clark | June 20, 1911 |
| 2,418,437 | Vogt | Apr. 1, 1947 |
| 2,422,317 | Stock et al. | June 17, 1947 |
| 2,721,971 | Francois | Oct. 25, 1955 |
| 2,794,950 | McNaughton | June 4, 1957 |

FOREIGN PATENTS

| 5,965 | Sweden | Apr. 20, 1895 |